United States Patent [19]

Kitagawa et al.

[11] Patent Number: 5,377,562
[45] Date of Patent: Jan. 3, 1995

[54] DRIVEN WHEEL TORQUE CONTROL SYSTEM

[75] Inventors: Hiroshi Kitagawa; Norio Suzuki, both of Saitama, Japan

[73] Assignee: Honda Giken Kogyo Kabushiki Kaisha, Tokyo, Japan

[21] Appl. No.: 756,841

[22] Filed: Sep. 11, 1991

[30] Foreign Application Priority Data

Sep. 12, 1990 [JP] Japan .................. 2-242143

[51] Int. Cl.$^6$ .............................................. F16H 59/18
[52] U.S. Cl. ...................... 477/110; 180/197
[58] Field of Search ............ 74/857, 859, 860; 364/424.03; 180/197

[56] References Cited

U.S. PATENT DOCUMENTS

| | | | |
|---|---|---|---|
| 3,741,043 | 6/1973 | Oya et al. | 180/197 X |
| 4,615,410 | 10/1986 | Hosaka | 180/197 |
| 4,855,914 | 8/1989 | Davis et al. | 74/866 X |
| 4,962,570 | 10/1990 | Hosaka et al. | 180/197 X |
| 5,002,147 | 3/1991 | Tezuka et al. | 180/197 |
| 5,018,595 | 3/1991 | Hara et al. | 180/197 |
| 5,038,883 | 8/1991 | Kushi et al. | 180/197 |
| 5,065,319 | 11/1991 | Iwatsuki et al. | 364/424.1 |
| 5,067,578 | 11/1991 | Shirata et al. | 74/860 X |

FOREIGN PATENT DOCUMENTS

| | | |
|---|---|---|
| 0301558A2 | 2/1989 | European Pat. Off. . |
| 3711913A1 | 10/1988 | Germany . |
| 3924922A1 | 2/1990 | Germany . |
| 63-31831 | 10/1988 | Japan . |
| 1-148629 | 6/1989 | Japan . |
| 1-269621 | 10/1989 | Japan .................. 74/859 |
| 1-269624 | 10/1989 | Japan .................. 74/859 |
| 1-269626 | 10/1989 | Japan .................. 74/859 |
| 1-269627 | 10/1989 | Japan .................. 74/859 |
| 2235992 | 3/1991 | United Kingdom . |

Primary Examiner—Dirk Wright
Attorney, Agent, or Firm—Armstrong, Westerman, Hattori, McLeland & Naughton

[57] ABSTRACT

In reducing a driven wheel output torque by a driven wheel output torque reducing device when slipping of a driven wheel becomes excessive in a vehicle including a torque converter between an internal combustion engine and the driven wheel, an output torque from the internal combustion engine is calculated and is first converted into a driven wheel applied toque in consideration of an amplification of the torque in the torque converter. Then, a surplus torque consumed for the slipping of the driven wheel is calculated, and a transmittable torque which can be actually transmitted to a road surface is calculated from the driven wheel applied torque and the surplus torque. On the basis of the transmittable torque, a decrement in driven wheel torque is determined. An over-control in the control of slipping of the driven wheel is prevented by taking an amplification of the torque by the torque converter into consideration in this manner.

5 Claims, 17 Drawing Sheets

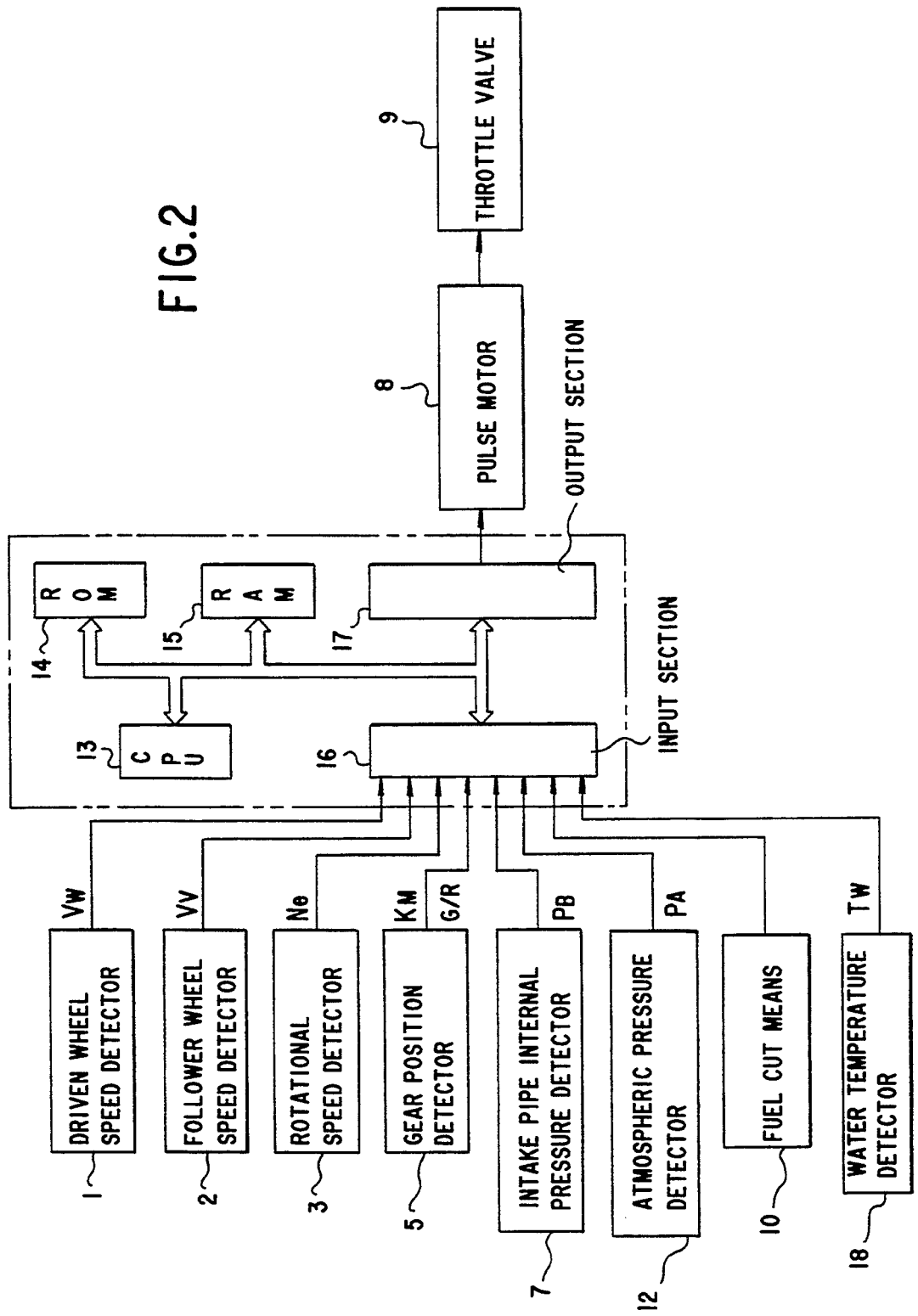

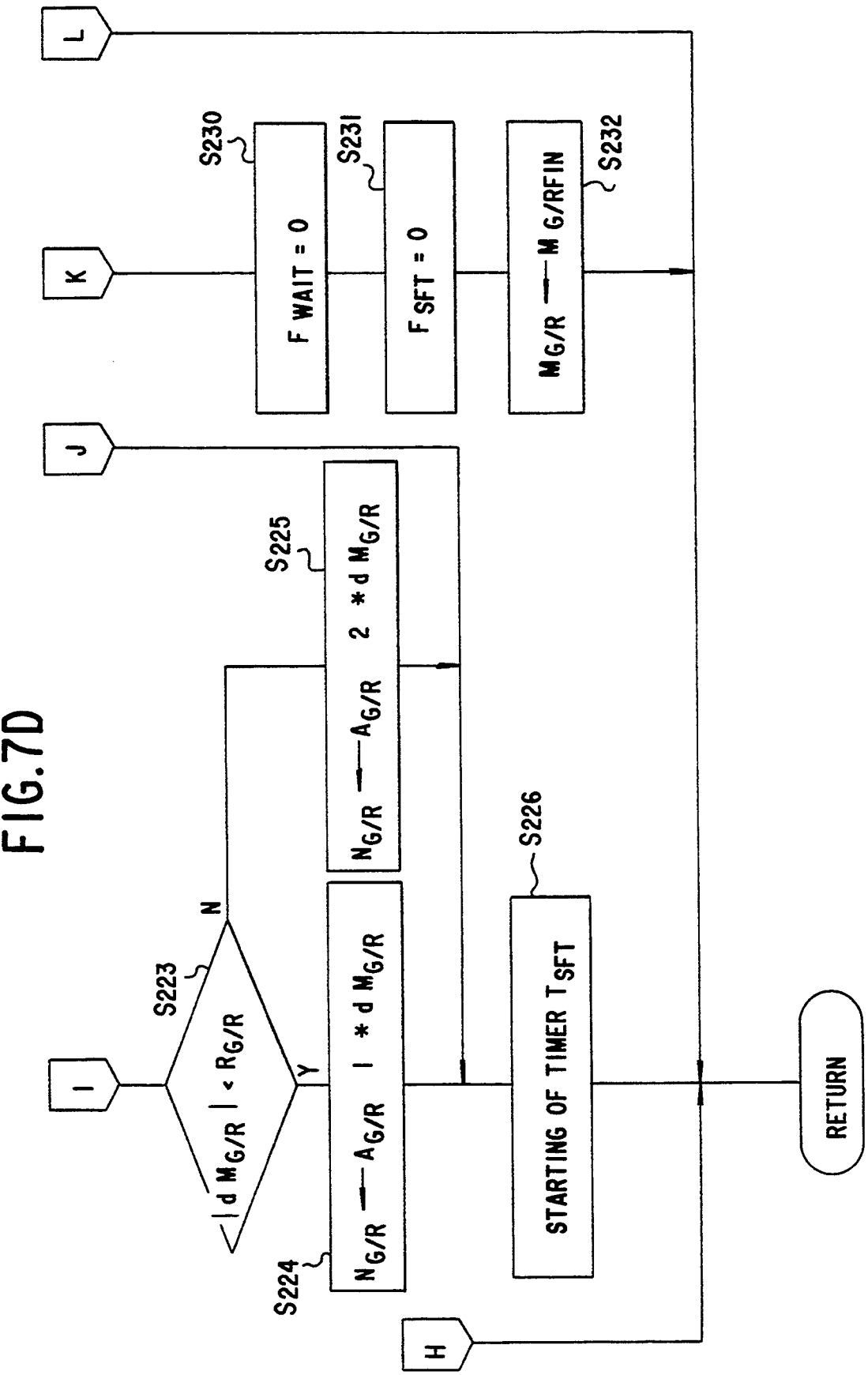

5,377,562

DRIVEN WHEEL TORQUE CONTROL SYSTEM

BACKGROUND OF THE INVENTION

1. Field of the Invention

The field of the present invention is driven wheel torque control systems of a type including a torque converter provided between an internal combustion engine of a vehicle and a driven wheel, and a driven wheel torque reducing means for reducing an output torque of the driven wheel when slipping of the driven wheel becomes excessive.

2. Description of the Related Art

A method has been proposed in which an output torque from the internal combustion engine is estimated in a traction control system, and a torque of the driven wheel is estimated from this estimated output torque and a reduction ratio between the internal combustion engine and the driven wheel (see Japanese Patent Application Laid-open No. 31831/88).

Another method has been also proposed in which a driven wheel torque is found in consideration of an amount of torque amplified by the torque converter in a vehicle provided with an automatic transmission, and the driven wheel torque reducing means is operated when such driven wheel torque exceeds a predetermined value (see Japanese Patent Application Laid-open No. 148629/89).

A construction in the latter measure is such that a driven wheel output torque is calculated on the basis of a current input/output rotational speed ratio of the torque converter, and slipping of the driven wheel is inhibited when such driven wheel torque exceeds a required value. However, an actual slipping of the driven wheel is produced by a surplus portion of the driven wheel torque which is increased with an increase in output torque from the internal combustion engine, and there is a somewhat time lag from an instant when the output torque from the internal combustion engine is increased to an instant when the driven wheel torque is increased. For this reason, when the driven wheel torque exceeds the required torque, the driven wheel is brought into a slipping state even if the driven wheel torque is controlled, and eventually, an on-off feed-back control around the required torque is conducted, thereby making it difficult to appropriately control the driven wheel torque.

SUMMARY OF THE INVENTION

Accordingly, it is an object of the present invention to provide a driven wheel torque control system including a torque converter provided between an internal combustion engine of a vehicle and a driven wheel, and a driven wheel torque reducing means for reducing an output torque from the driven wheel, when slipping of the driven wheel becomes excessive, wherein in calculating an effective driven wheel torque to be found (which is a transmittable torque in the present patent application), an influence of the amplification of the torque by a torque converter is taken into consideration, thereby ensuring that a correct transmittable torque can be calculated to find out an appropriate initial control quantity.

To achieve the above object, according to a first aspect of the present invention, there is provided a driven wheel torque control system including a torque converter provided between an internal combustion engine of a vehicle and a driven wheel, and a driven wheel torque reducing means for reducing an output torque of the driven wheel when slipping of the driven wheel becomes excessive, the system comprising an internal combustion engine output torque calculating means for calculating an output torque from the internal combustion engine; a driven wheel applied torque calculating means for converting the internal combustion engine output torque calculated by the internal combustion engine output torque calculating means into a driven wheel applied torque by use of a torque ratio of the torque converter; a surplus torque calculating means for calculating a surplus torque consumed for slipping of the driven wheel; a transmittable-torque calculating means for calculating torque transmittable between the driven wheel and a road surface on the basis of output signals from the driven wheel applied torque calculating means and the surplus torque calculating means; and a control quantity determining means for calculating a control quantity for the driven wheel torque reducing means by use of the transmittable torque.

With the above construction, the torque ratio of the torque converter is taken into consideration, when the driven wheel applied torque is calculated. Therefore, it is possible to calculate an appropriate transmittable torque based on a correct driven wheel applied torque and consequently, it is possible to prevent an over-control in controlling the slipping of the driven wheel.

In addition to the first aspect, according to a second aspect of the present invention, a variable reduction gear is further provided between the internal combustion engine and the driven wheel, and the surplus torque is calculated on the basis of a slip variation rate of the driven wheel and a reduction ratio of the variable reduction gear.

With the above construction, it is possible to correctly calculate a surplus torque required to calculate a transmittable torque of the driven wheel.

In addition to the first and second aspects, according to a third aspect of the present invention, the driven wheel torque reducing means is an internal combustion engine output torque control means and comprises a driven wheel target speed calculating means for calculating a target speed of the driven wheel; an estimation torque ratio calculating means for calculating an estimation torque ratio at a time when the driven wheel torque reducing means is controlled, by use of the driven wheel target speed as an output rotational number of the torque converter; and a means for correcting the control quantity for the internal combustion engine output torque control means by the estimation torque ratio.

With the above construction, an output rotational number and a torque ratio of the torque converter under a control convergence condition can be estimated on the basis of the driven wheel speed which is converged when a control quantity based on a correct driven wheel applied torque is provided. Therefore, the control quantity at such estimated torque ratio can be further correctly calculated, leading to an improvement in accuracy of control.

According to a fourth aspect of the present invention, there is provided a driven wheel torque control system including a torque converter provided between an internal combustion engine of a vehicle and a driven wheel, and a driven wheel torque reducing means for reducing an output torque from the driven wheel when slipping of the driven wheel becomes excessive, the system comprising an internal combustion engine output torque calculating means for calculating an output torque from the internal combustion engine; a driven wheel target speed calculating means for calculating a target speed of the driven wheel; an estimation torque ratio calculating means for calculating an estimation torque ratio at a time when the driven wheel torque reducing means is controlled, by use of the target speed of the driven wheel as an output rotational number of the torque converter; a driven wheel applied torque calculating means for converting the internal combustion engine output torque calculated by the internal combustion engine output torque calculating means into a driven wheel applied torque by use of the estimation torque ratio; and a control quantity determining means for calculating a control quantity for the driven wheel torque reducing means on the basis of the driven wheel applied torque.

With the above construction, it is not required to calculate a surplus torque when the torque of the driven wheel is compared with a given threshold value as in the prior art. Therefore, a value of the driven wheel applied torque can be estimated on the basis of only the estimation torque ratio of the torque converter which is calculated on the basis of the driven wheel speed (driven wheel target speed) at the time when the slipping of the driven wheel is converged. Consequently, it is possible to simply control the slipping of the driven wheel in consideration of the torque ratio of the troque converter.

The above and other objects, features and advantages of the invention will become apparent from a reading of the following description of the preferred embodiments, taken in conjunction with the accompanying drawings.

BRIEF DESCRIPTION OF THE DRAWINGS

FIG. 2 is a block diagram illustrating an electronic control unit;

FIGS. 7A to 7D are a flow chart illustrating a subroutine of a step S27;

DESCRIPTION OF THE PREFERRED EMBODIMENTS

The present invention will now be described by way of a preferred embodiment in connection with the accompanying drawings.

Figure 1:
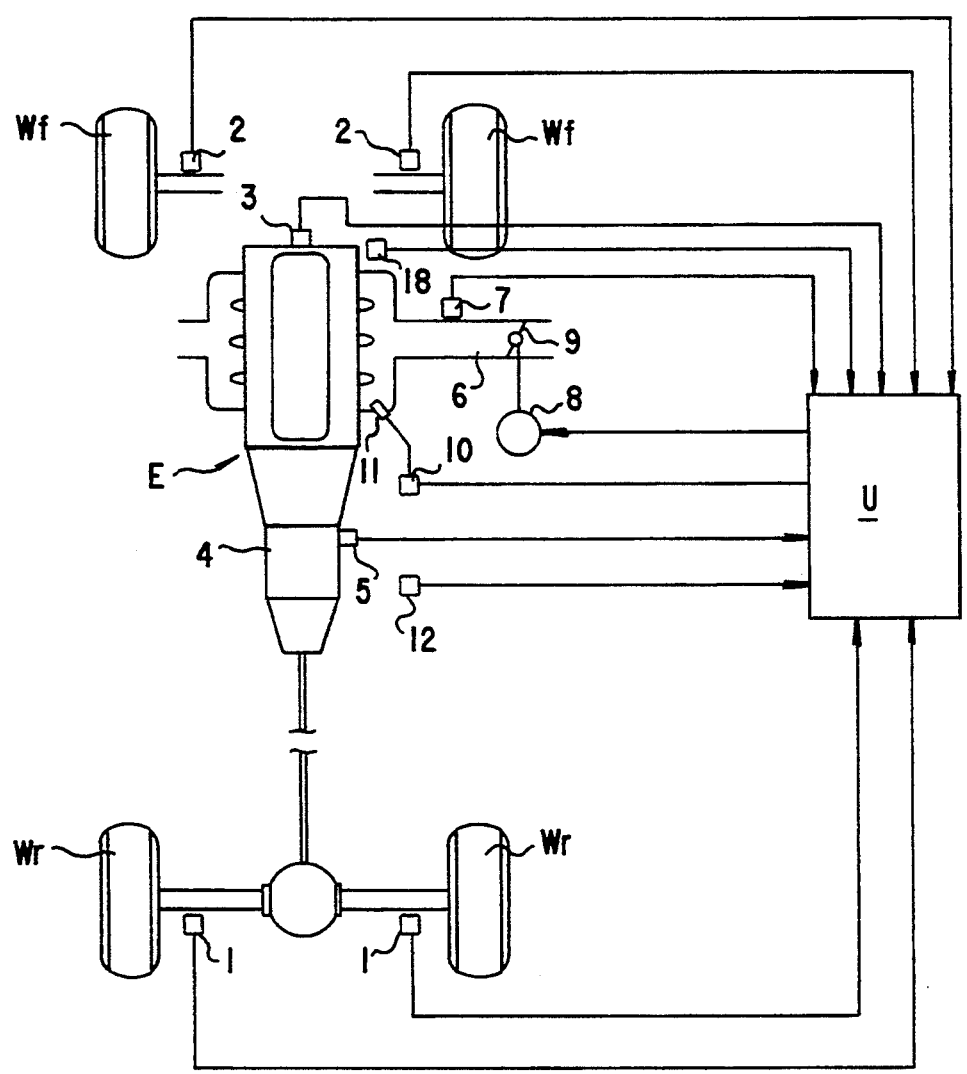
FIG. 1 is a schemetic diagram illustrating a construction of a vehicle equiped with a control system according to the present invention.

FIG. 1 schematically illustrates a construction of a vehicle provided with a control system according to the present embodiment. The vehicle comprises a pair of driven wheels Wr driven by an internal combustion engine E, and a pair of follower wheels Wf. Driven wheel speed detectors 1 and follower wheel speed detectors 2 are mounted on the driven wheels Wr and the follower wheels Wf for detecting the speeds Vw and Vv of the driven and follower wheels Wr and Wf, respectively. The internal combustion engine E is provided with a rotational speed detector 3 comprised of a gear and an electromagentic pick-up for detecting the rotational speed Ne of a crankshaft of the engine E, and a gear position detector 5 for detecting the gear position of an automatic transmittion 4 having a torque converter. Provided in an intake passage 6 in the internal combustion engine E are an intake pipe internal pressure detector 7 for detecting the internal pressure $P_B$ in an intake pipe, and a throttle valve 9 connected to a pulse motor 8 and driven to be opened and closed. Further, a fuel injection valve 11 including a fuel-cut means 10 is provided at a downstream end of the intake passage 6. There are other detectors: an atmospheric pressure detector 12 for detecting the atmospheric pressure $P_A$, and a water-temperature detector 18 for detecting the temperature Tw of cooling water in a water jacket. The driven wheel speed detectors 1, the follower wheel speed detectors 2, the rotational speed detector 3, the gear position detector 5, the intake pipe internal pressure detector 7, the pulse motor 8, the fuel-cut means 10, the atmospheric pressure detector 12 and the water-temperature detector 18 are connected to an electronic control unit U comprising a microcomputer.

FIG. 2 illustrates the electronic control unit U for arithmetically processing detection signals received from the individual detectors according to a control program to drive the throttle valve 9 through the pulse motor 8. The electronic control unit U is comprised of a central processing unit (CPU) 13 for effecting the above-described arithmetically processing, a read only memory (ROM) 14 having the control program and data such as various maps stored therein, a random access memory (RAM) 15 for temporarily storing the detection signals from the detectors and the results of arithmetically calculation, an input section 16 to which the detectors, i.e., the driven wheel speed detector 1, the follower wheel speed detectors 2, the rotational speed detector 3, the gear position detector 5, the intake pipe internal pressure detector 7, the fuel-cut means 10, the atmospheric pressure detector 12 and the water-temperature detector 18 are connected, and an output section 17 to which the pulse motor 8 is connected. The electronic control unit U arithemetically processes the detection signals received thereinto through the input section 16 and the data stored in the read only memory 14 in the central processing unit 13 according to the control program, and finally drives the pulse motor 8 through the output section 17. This causes the throttle valve 9 to be controlled to be closed, so that the output torque from the internal combustion engine E is varied and as a result, the driven wheel torque is controlled to an optimal value to restrain an excessive slipping of the driven wheel Wr.

The contents of the control of the driven wheel torque carried out in the electronic control unit U will be described in detail in connection with FIGS. 3 to 12. A flow chart in FIGS. 4A and 4B indicates a subroutine corresponding to a step S3 in FIG. 3A, and flow charts in FIGS. 5, 7A to 7D, 9 and 12 indicate subroutines corresponding to steps S25, S27, S28 and S33 in FIG. 4A, respectively.

Figure 3A:
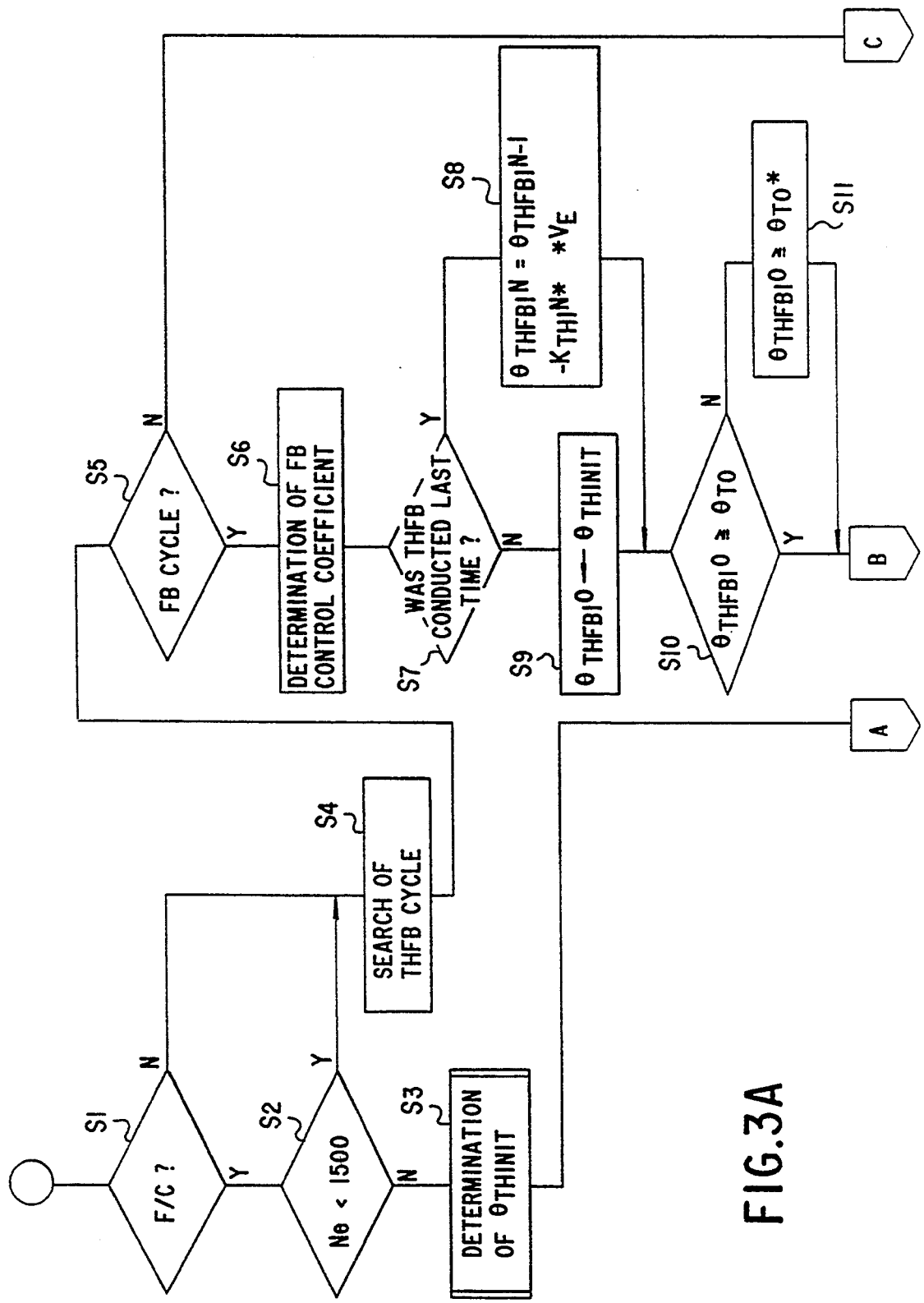
FIGS. 3A and 3B are a flow chart illustrating the contents of a control in the electronic control unit.
Figure 3B:
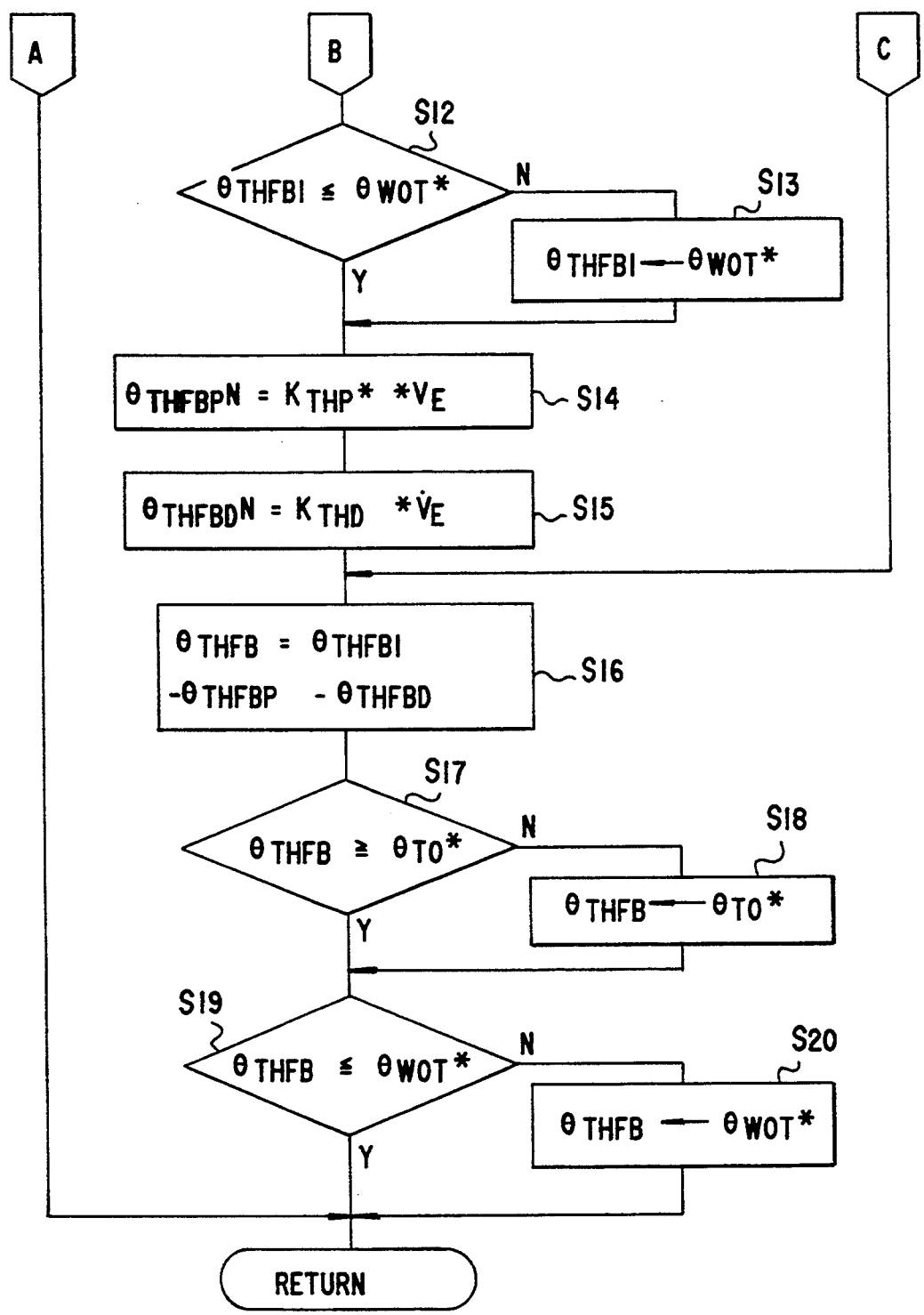

Referring to FIG. 3A, it is decided at a step S1 on the basis of a signal from the fuel-cut means 10 whether or not fuel supply is being cut. At a step S2, it is decided on the basis of a detection signal from the rotational speed detector 3 whether or not the rotational speed Ne is equal to or less than 1,500 RPM. If it has been decided that the fuel supply is being cut and Ne>1,500 RPM, the processing is advanced to the step S3. In other cases, the processing is advanced to a step S4. The fuel cutting is carried out when it has been decided that a slipping $V_E$ of a driven wheel, i.e., a difference resulting from subtraction of a target driven wheel speed $V_{RP}$ which is a function of the follower wheel speed Vv produced by the follower wheel speed detector 2 from the driven wheel speed Vw produced by the driven wheel speed detector 1 is sufficiently large, and that the driven wheel Wr is excessively slipping. Here, the above values $V_E$ and $V_{RP}$ are represented by the following expressions:

$$V_E = V_w - V_{RP}$$

$$V_{RP} = F(V_v) = K*V_v$$

wherein K is a constant.

If the fuel is being cut and a condition of Ne>1,500 RPM is not established, a throttle feed-back cycle which is a function of the rotational speed Ne of the internal combustion engine E is searched on the basis of a map at the step S4. At a subsequent step S5, it is decided whether or not the feed-back cycle is being conducted. If YES, control coefficients $K_{THP}^*$, $K_{THI}^*$ and $K_{THD}^*$ for a PID feed-back control of a throttle opening degree are determined at a step S6 to effect the PID feed-back control. Then, it is decided at a step S7 whether or not the throttle feed-back was conducted last time. If YES, an I term: $\theta_{THFBI}^N$ is calculated according to the following equation:

$$\theta_{THFBI}^N = \theta_{THFBI}^{N-1} - K_{THI}^{N*}*V_E$$

In the above equation, a minus sign is inserted before a second member on a right side because $V_E$ assumes a positive value larger than zero. On the other hand, if NO at the step S7, an initial throttle opening degree $\theta_{THINIT}$ which will be described hereinafter is replaced by $\theta_{TNFBI}^O$ at a step S9. If the I term: $\theta_{TNFBI}$ is found, a limitation is applied to the I term at steps S10 to S13. More specifically, at the step S10, it is decided whether or not the $\theta_{THFBI}$ is equal to or more than a throttle opening degree $\theta_{TO}^*$ which compensates for a component corresponding to a friction in the value internal combustion engine E. If NO, the $\theta_{TO}^*$ is replaced by $\theta_{THFBI}$ at the step S11. It is decided at the step S12 whether or not the value $\theta_{THFBI}$ is equal to or less than a throttle opening degree $\theta_{WOT}^*$ corresponding to 80% of a throttle opening degree at which the internal combustion engine produces the maximum torque. If NO, $\theta_{WOT}^*$ is replaced by $\theta_{THFBI}$ at the step S13. Then, at a step S14, a P term: $\theta_{THFBP}^N$ is calculated according to the following equation:

$$\theta_{THFBP}^N = K_{THP}^* * V_E$$

and further, at a step S15, a D term: $\theta_{THFBD}^N$ is calculated according to the following equation:

$$\theta_{THFBD}^N = K_{THD}^* * V_E$$

Subsequently, if a feed-back control quantity $\theta_{THFB}$ is calculated at a step S16 according to the following equation:

$$\theta_{THFB} = \theta_{THFBI} - \theta_{THFBP} - \theta_{THFBD}$$

wherein a minus sign is inserted before each of second and third members on a right side because $V_E$ likewise assumes a positive value larger than zero, a limitation is applied to the feed-back control quantity $\theta_{THFB}$ at steps S17 to S20. More specifically, it is decided at the step S17 whether or not $\theta_{THFB}$ is equal to or more than the above-described $\theta_{TO}^*$. If NO, $\theta_{TO}^*$ is replaced by the $\theta_{THFB}$ at step S18. It is decided at the step S19 whether or not $\theta_{THFB}$ is equal to or less than the $\theta_{WOT}^*$. If NO, the $\theta_{WOT}^*$ is replaced by $\theta_{THFB}$ at the step S20.

Figure 4A:
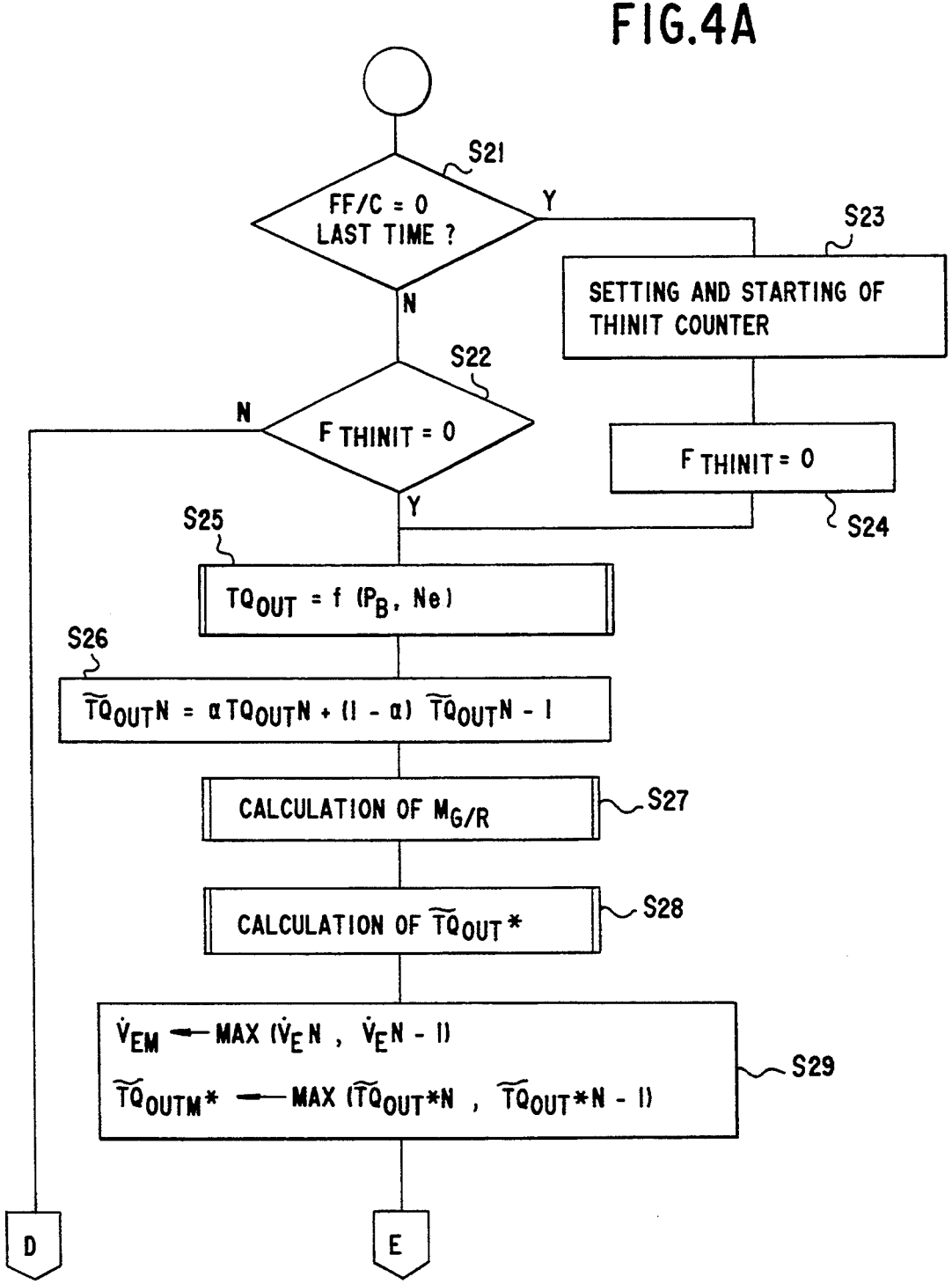
FIGS. 4A and 4B are a flow chart illustrating a subroutine of a step S3.
Figure 4B:
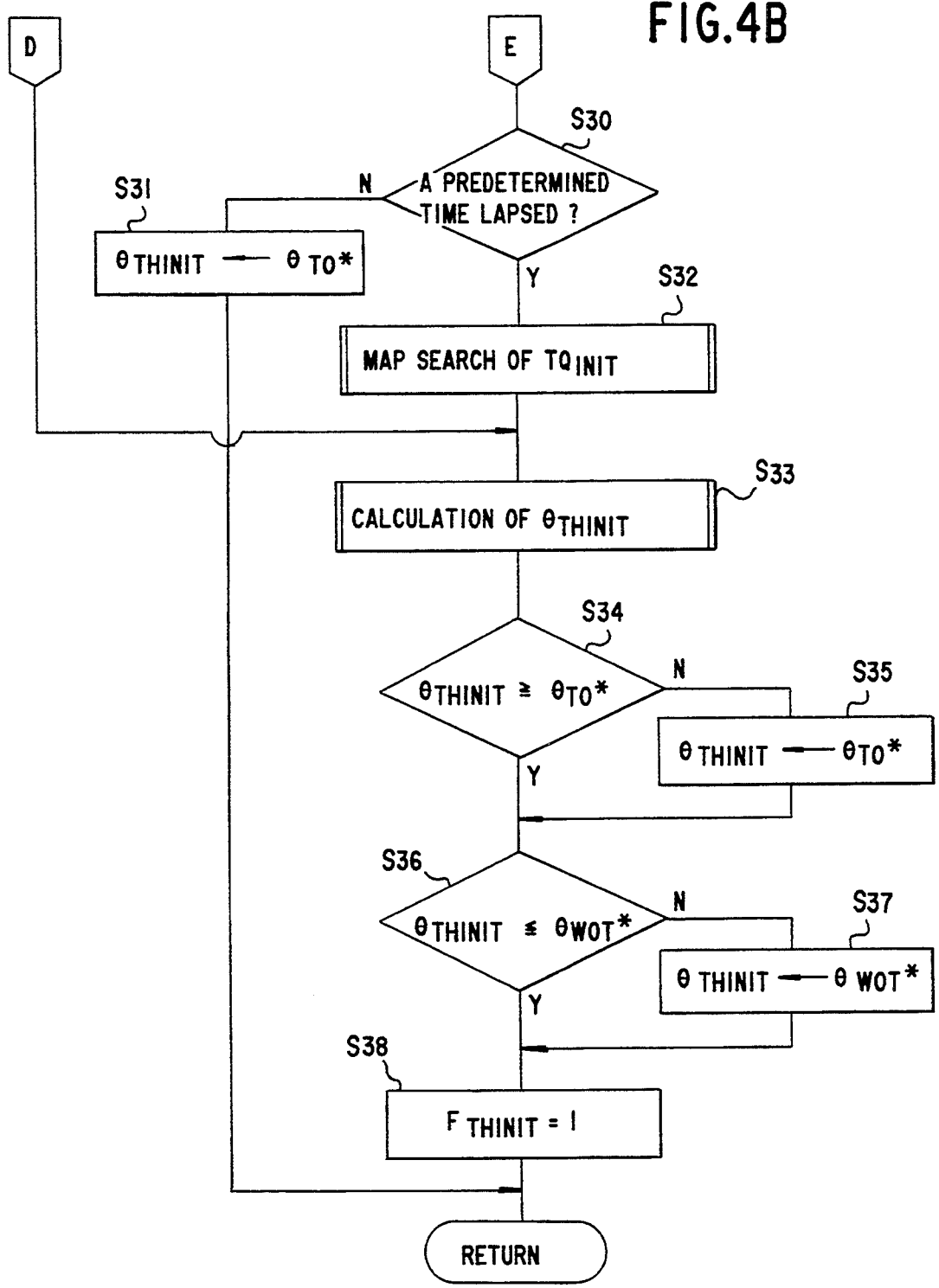
Figure 5:
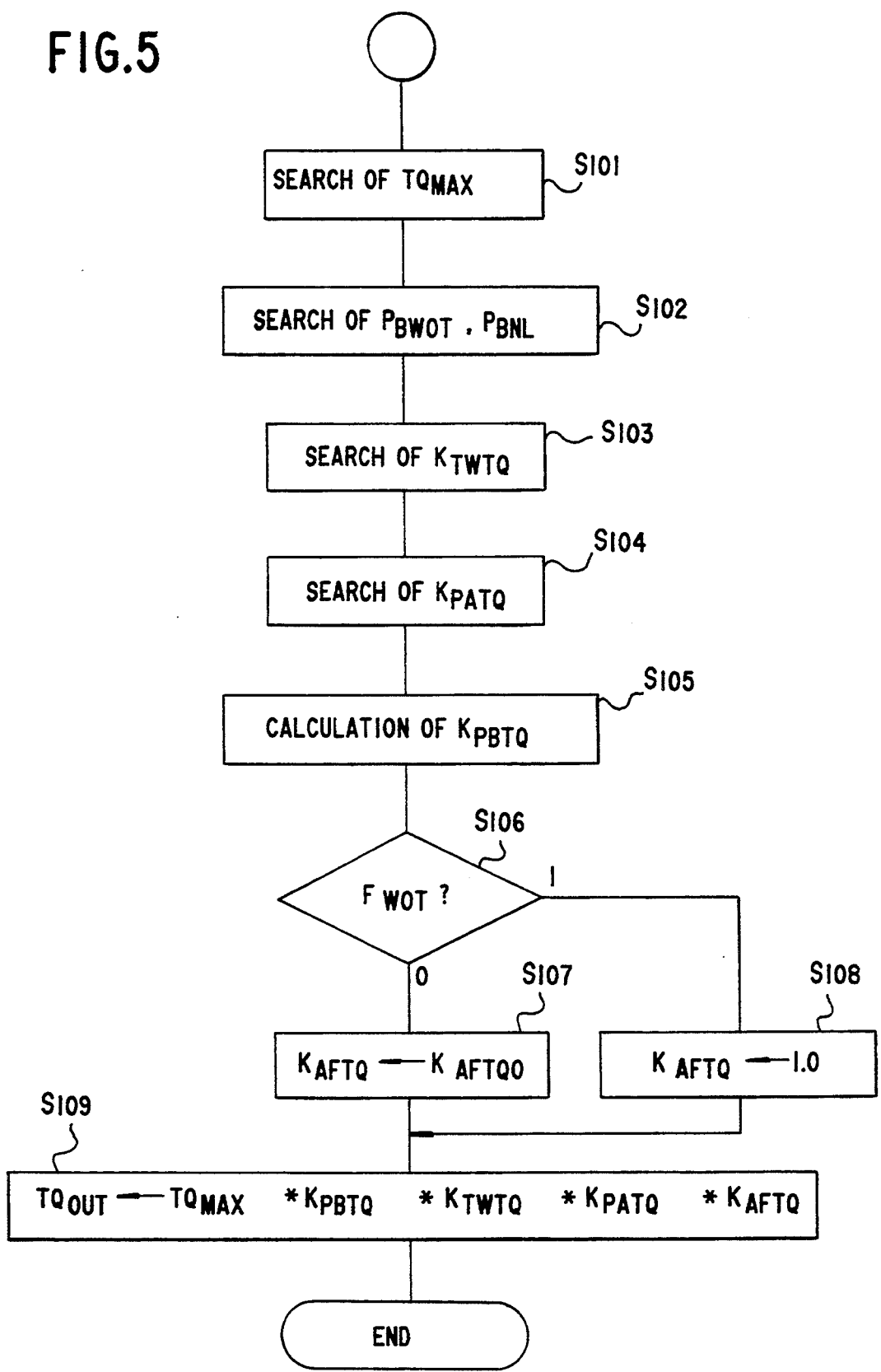
FIG. 5 is a flow chart illustrating a subroutine of a step S25.

If it has been decided at the steps S1 and S2 that the fuel is being cut and Ne>1,500 RPM is established, the step S3, i.e., the subroutine shown in the flow chart in FIGS. 4A and 4B is carried out by an interruption of 10 m sec. First, it is decided at a step S21 whether or not a last fuel-cut flag $F_{F/C}$ is zero. If NO, i.e., if the fuel ie being cut, it is further decided at a step S22 whether or not a throttle initializing flag $F_{THINIT}$ is zero. If YES, the processing is advanced to a step S25, and if NO, the processing is advanced to a step S33 on the basis of the decision that the initial throttle opening degree $\theta_{THINIT}$ has been already found. If it has been decided at the step S21 that the fuel-cut flag $F_{F/C}$ is zero, i.e., if a fuel-cutting has been now conducted for the first time, a throttle initializing counter is set at 100 m sec. at a step S23 and started. At a next step S24, the throttle initializing flag $F_{THINIT}$ is reset at zero, proceeding to a step S25.

At the step S25, an output torque $TQ_{OUT}$ from the internal combustion engine is calculated as a function of the intake pipe internal pressure $P_B$ and the rotational speed Ne of the internal combustion engine. More specifically, at a step S101 in FIG. 5 which is a subroutine of the step S25, a maximum torque $TQ_{MAX}$ of the crankshaft during full opening of the throttle valve is searched from a table in correspondence to a current rotational speed Ne if the internal combustion engine E. Then, at a step S102, an intake pipe internal pressure $P_{BWOT}$ during full opening of the throttle valve and an intake pipe internal pressure $P_{BWOT}$ during non-loading are searched from the table in correspondence to the rotational speed Ne of the internal combustion engine E. Then, at a step S103, a water-temperature correcting factor $K_{TWTQ}$ is searched from the table on the basis of an output signal from the water-temperature detector 18, and at a step S104, an atmospheric pressure correcting factor $K_{PATQ}$ is searched from the table on the basis of an output signal from the atmopsheric pressure detector 12. At a step S105, an intake pipe internal pressure correcting factor $K_{PBTQ}$ is calculated by the following linear interpolation equation from the intake pipe internal pressure $P_{BWOT}$ during full opening of the throttle valve and the intake pipe internal pressure $P_{BWOT}$ during non-loading, which have been searched at the step S102, and a current intake pipe internal pressure $P_B$:

$$K_{PBTQ} = (P_B - P_{BNL})/(P_{BWOT} - P_{BNL})$$

Then, it is decided at a step S106 whether or not an air-fuel ratio flag $F_{WOT}$ has been set. If the air-fuel ratio flag $F_{WOT}$ has been set, i.e., in a normal operational condition, 1 is selected as an air-fuel ratio correcting factor $K_{AFTQ}$ at a step S108. If the air-fuel ratio flag $F_{WOT}$ has not been set, i.e., in a low load operation, a predetermined value $K_{AFTQO}$ (0.9) is selected as the air-fuel ratio correcting factor $K_{AFTQ}$ at a step S107. At a step S109, an output torque from the internal combustion engine corresponding to a current intake pipe internal pressure $P_B$ is calculated by multiplication of the crankshaft maximum torque $TQ_{MAX}$ searched at the step S101 by the intake pipe internal pressure correcting factor $K_{PBTQ}$ calculated at the step S105. The resulting value is multiplied by the water-temperature correcting factor $K_{TWTQ}$ searched at the step S103, the atmospheric pressure correcting factor $K_{PATQ}$ searched at the step S104, and the air-fuel ratio correcting factor $K_{AFTQ}$ selected at the step S107 or S108, whereby a current internal combution engine output torque $TQ_{OUT}$ is estimated. In place of the estimation of the internal combustion engine output torque $TQ_{OUT}$ using the intake pipe internal pressure $P_{BWOT}$ during full opening of the throttle valve and the intake pipe internal pressure $P_{BNL}$ during non-loading, the crankshaft maximum torque $TQ_{MAX}$ can be estimated by a linear interpolation equation from amounts of fuel injected during full opening of the throttle valve and during idling. The internal combustion engine output torque $TQ_{OUT}$ is estimated at the step S25 in FIG. 4A in the above manner, but until the internal combustion engine output torque $TQ_{OUT}$ is varied after the operational condition of the internal combustion E has been varied, a somewhat time lag is produced, because it takes a time until air detected in the intake pipe internal pressure detector 7 is drawn into the internal combustion engine E and compressed and exploded. For this reason, the internal combustion engine output torque $TQ_{OUT}$ is subjected, at a next step S26, to a filtering according to the following equation:

$$\widetilde{TQ}_{OUT}^{N} = \alpha * \widetilde{TQ}_{OUT}^{N} + (1+\alpha) * \widetilde{TQ}_{OUT}^{N-1}$$

wherein $0 < \alpha < 1$.

This filtering causes an error due to the above-described time lag to be absorbed, ensuring that even in a transition period of the operational condition of the internal combustion engine E, an accurate internal combustion engine output torque $\widetilde{TQ}_{OUT}$ is estimated at each moment.

Figure 6:
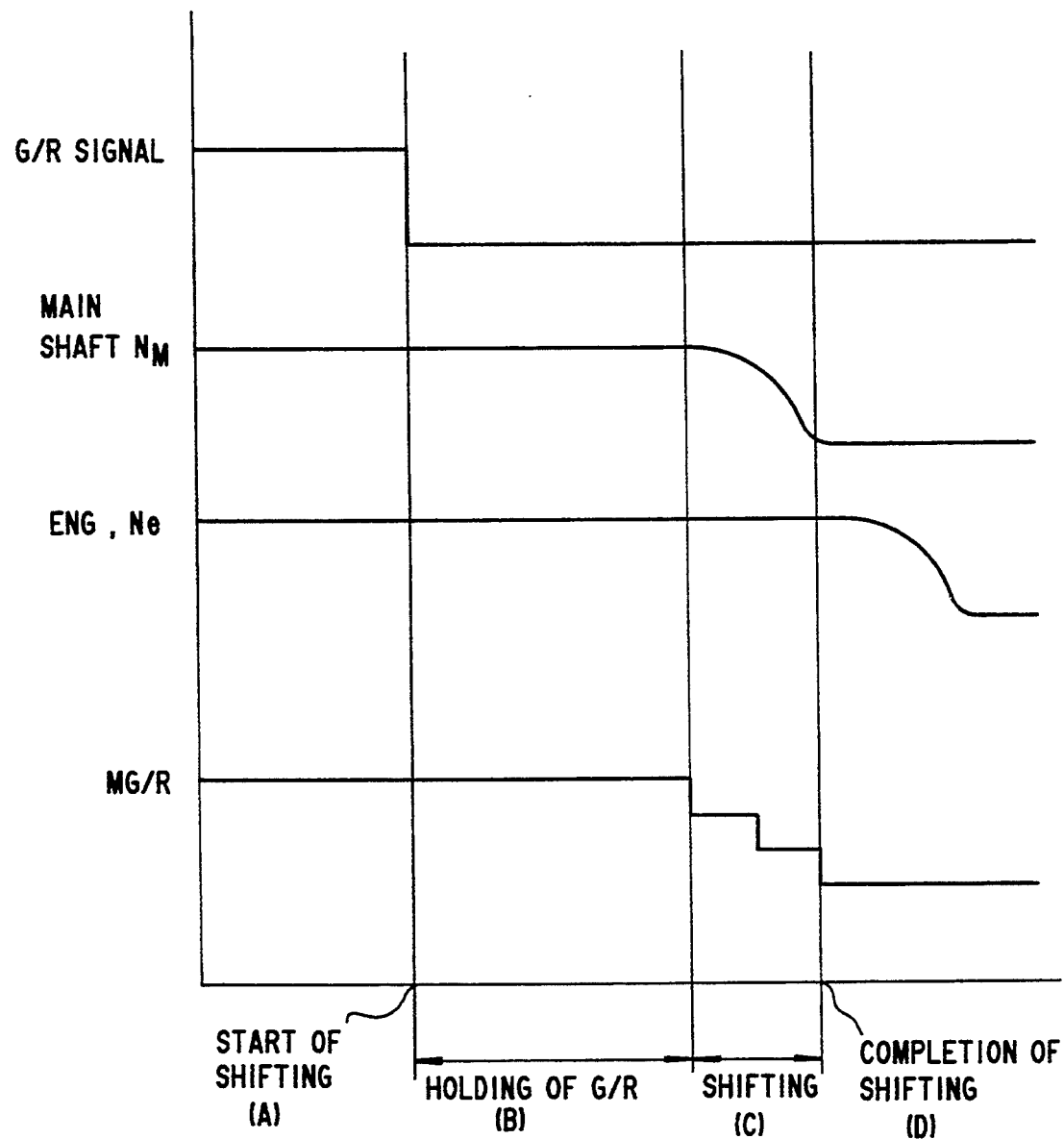
FIG. 6 is a time chart illustrating a variation in $M_{G/R}$ during shifting.

Then, a pseudo or false reduction ratio $M_{G/R}$ in a shift change of the automatic transmission 4 is found at a step 27. That is, even if the start of shifting is detected at a position A by changing of a gear ratio signal produced by the gear position detector 5 as shown in FIG. 6, there is a time lag in an operation of a solenoid providing a shift change in a period B and for this reason, the shift change is actually not conducted, and the gear ratio G/R is held to a value before shifting. In a subsequent period C, the shift change is actually condcted, so that the rotational speed $N_M$ in a main shift is varied, and during this time, the phantom pseudo reduction ratio $M_{G/R}$ varied stepwise is provided. If the shift change is completed at a period D, the rotational speed of the internal combustion engine E is started to be varied by the torque converter, while at the same time, a gear ratio G/R after shifting is established.

FIGS. 7A to 7D illustrate a subroutine of the step S27 for calculating the pseudo reduction ratio $M_{G/R}$. At a step S201 in FIG. 7A, a difference dG/R between a current gear ratio $G/R^N$ and a last gear ratio $G/R^{N-1}$ is calculated. If it is decided at a step S202 that the difference dG/R is not zero (if a shift signal has been produced as shown in FIG. 6) and if it is decided at steps S203 and S204 that a shift delay flag $F_{wait}$ and a shift change flag $F_{sft}$ which will be described hereinafter are still not set (if the shift signal has been newly produced), a preparation which will be described hereinafter is conducted to prepare for an actual shift change. More specifically, at a step S205, the last gear ratio $G/R^{N-1}$ is determined as a pseudo reduction ratio $M_{G/RST}$ being held, and at a step S206, the current gear ratio $G/R^N$ is determined as a pseudo reduction ratio $M_{G/Rfin}$ after completion of the shift change. Then, at a step S207, it is decided wether the difference dG/R is positive or negative. In accordance with the result thereof, a shift delay timer $t_{wait}0$ for an up-shift and a shift delay timer $t_{wait}1$ for a down-shift are exchanged at steps S208 and S209. Then, at a step S210, a shift delay timer $t_{wait}$ is set and started at a step S210 (entering into the period B in FIG. 6), and at a step S211, the pseudo reduction ratio $M_{G/RST}$ being held is determined as the pseudo reduction ratio $M_{G/R}$. At a step S212, a shift change timer $t_{sft}$ is set. At a step S213, the shift delay flag $F_{wait}$ is set, and at a step S214, a shift change flag $F_{sft}$ is reset. If the shift flag $F_{sft}$ is 1 at the steps S204 and S215, this indicates that the shift signal has been newly received during shift change. In this case, at a step S216, the pseudo reduction ratio $M_{G/F}$ in the last shift change is determined as the pseudo reduction ratio $M_{G/RST}$ being held.

Figure 7A:
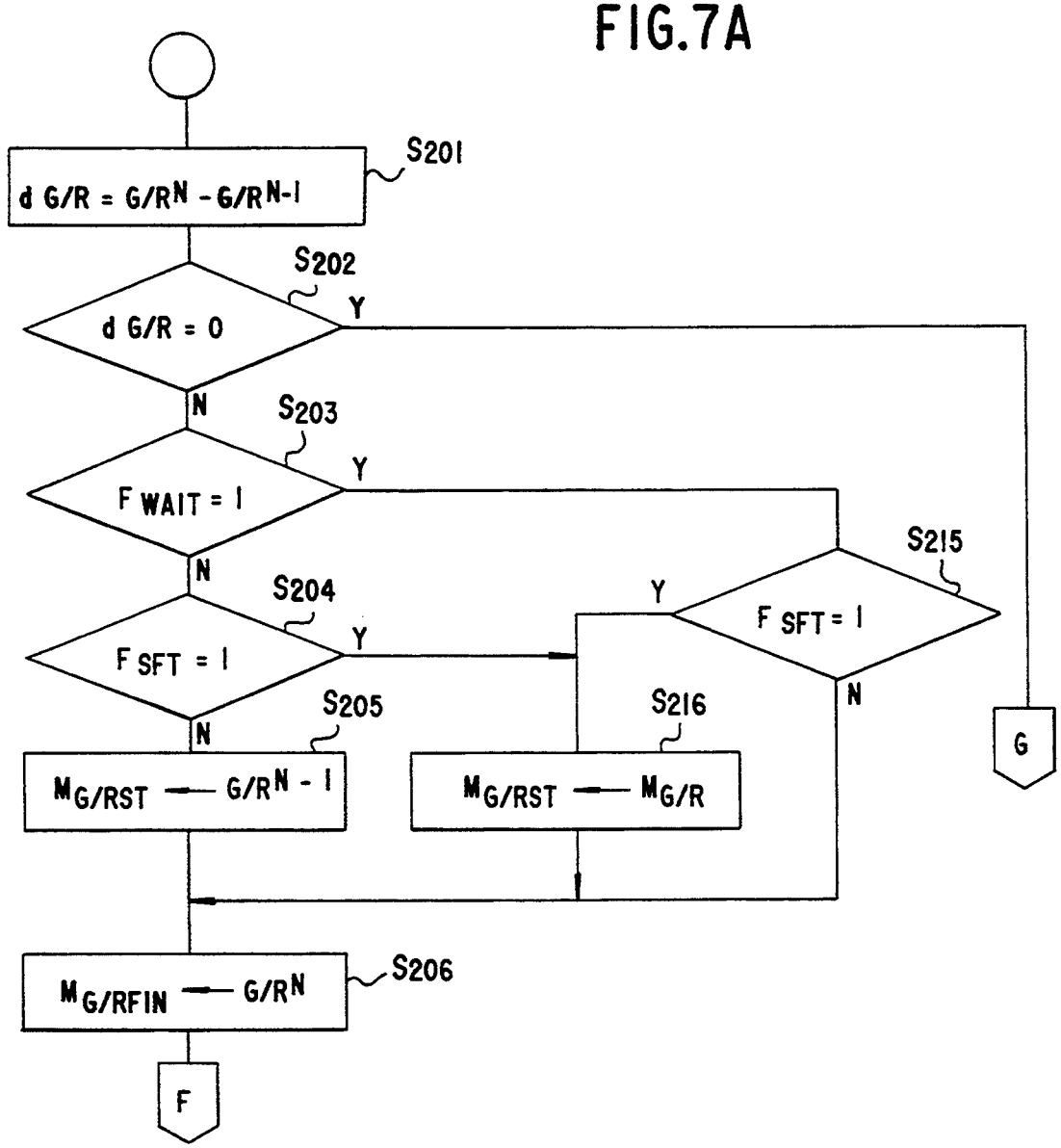
Figure 7B:
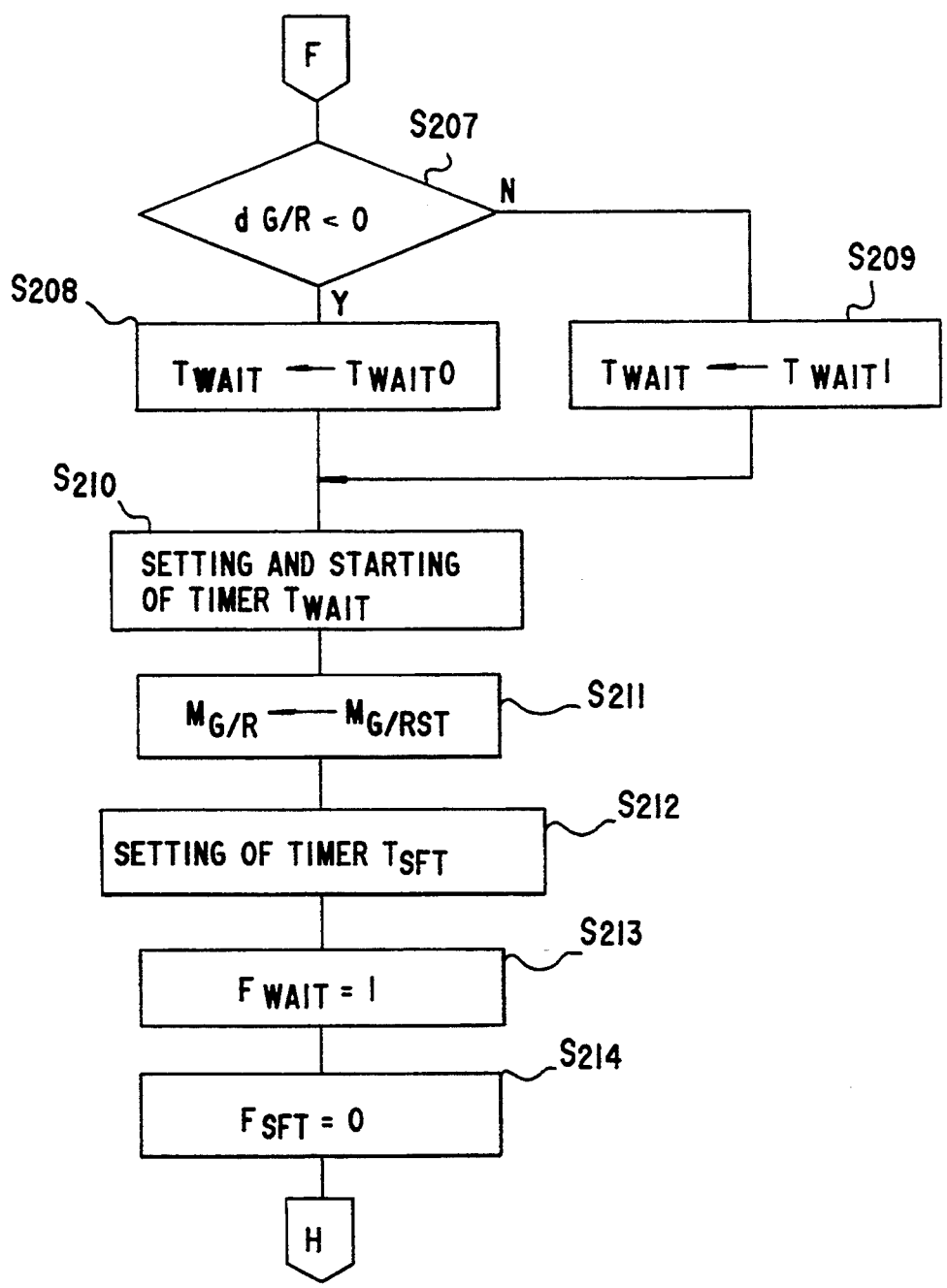
Figure 7C:
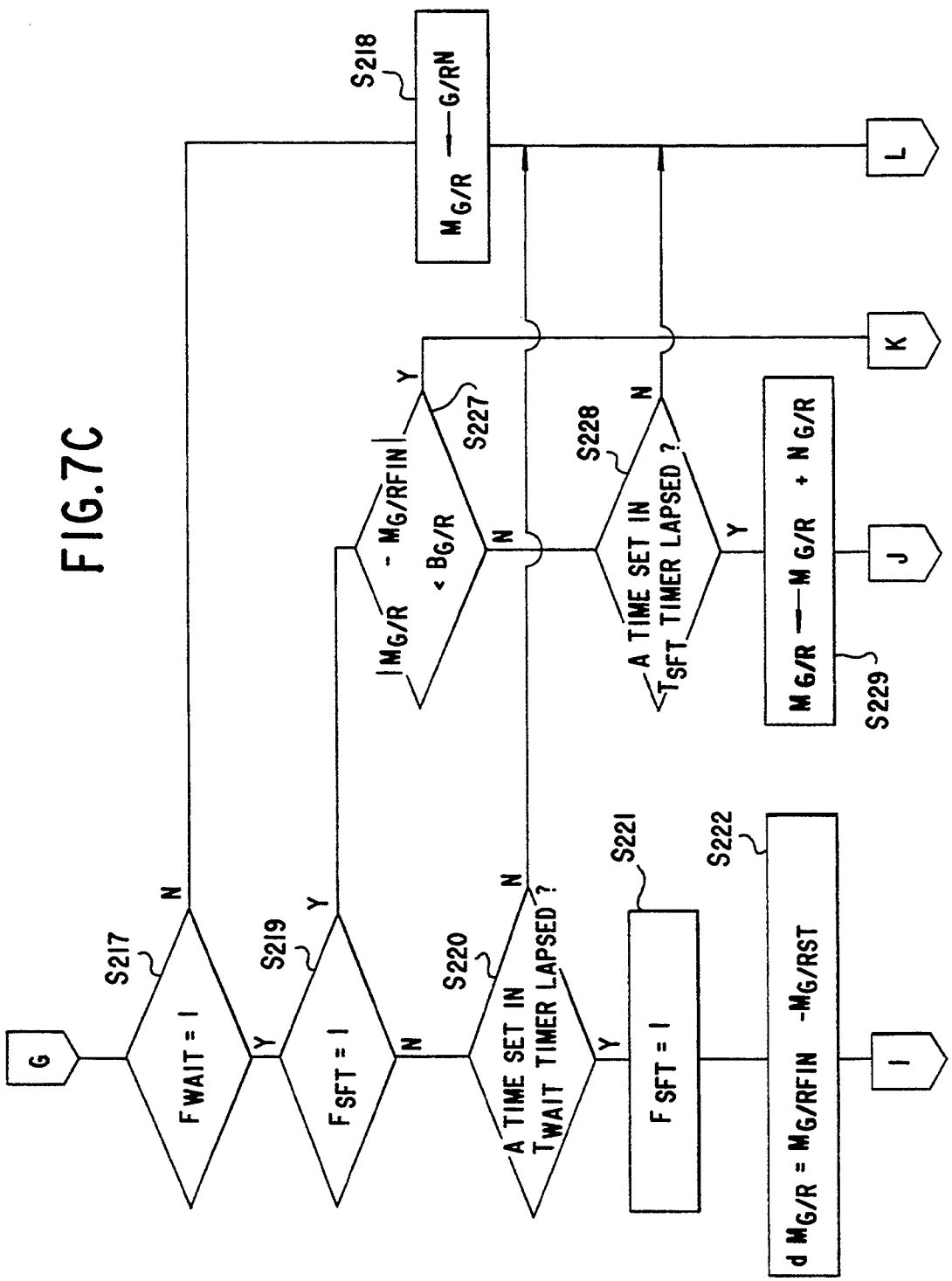

If YES at the step S202, i.e., if the shift signal is not produced, the processing is advanced to a step S217 in FIG. 7C. And there, if the shift delay flag $F_{wait}$ is 0, this means that the shift change is not conducted, and at a step S218, the current gear ratio $G/R^N$ is determined as the pseudo reduction ratio $M_{G/R}$. On the other hand, if the shift delay flag $F_{wait}$ is 1 at the step S217, this means that the shift change is to be conducted. If the shift change flag $t_{sft}$ is 0 at a next step S219, a time-up of the shift delay timer $t_{wait}$ is waited at a step S220 and thereafter, the shift change flag $F_{sft}$ is set at a step S221. Subsequently, a difference $dM_{G/R}$ between the pseudo reduction ratios $M_{G/RST}$ and $M_{G/Rfin}$ found at the steps S205 and S206 is calculated at a step S222. If it is decided at a step S223 that an absolute value of the difference $dM_{G/R}$ is smaller than the reference value $R_{G/R}$, a cut or divided width $N_{G/R}$ is calculated by a product of a constant $A_{G/R}1$ and $dM_{G/R}$ at a step S224. Reversely, if the absolute value of the difference $dM_{G/R}$ is smaller than the reference value $R_{G/R}$ at the step S223, a cut width $N_{G/R}$ is calculated by a product of a constant $A_{G/R}2$ and $dM_{G/R}$ at a step S225. If the cut width $N_{G/R}$ is calculated in this manner, the shift change timer $t_{sft}$ is started at a step S226 to enter into the period C in FIG. 6.

If the shift delay flag $F_{wait}$ is set at the step S221 as described above, the decision in the step S219 becomes YES. At a step S227, if an absolute value of a difference between the pseudo reduction ratio $M_{G/R}$ and the pseudo reduction ratio $M_{G/Rfin}$ after shift change is larger than the reference value $B_{G/R}$, and at a step S228, if the set time of the shift change timer $t_{sft}$ has been lapsed, the pseudo reduciton ratio $M_{G/R}$ is increased by the cut width $N_{G/R}$. During shift change (in the period C in FIG. 6), the pseudo reduciton ratio $M_{G/R}$ is increased or decreased stepwise by the cut width $N_{G/R}$ in this manner, whenever the set time of the shift change timer $t_{sft}$ has been lapsed, in order to compensate for the difference between the pseudo reduction ratios $M_{G/RST}$ and $M_{G/Rfin}$. If the decision in the step S227 is YES and the shift change is completed (at the point D in FIG. 6), the shift delay flag $F_{wait}$ and the shift change flag $F_{sft}$ are cleared at steps S230 and S231, respectively, the pseudo reduction ratio $M_{G/Rfin}$ after shift change is determined as the pseudo reduction ratio $M_{G/R}$ at a step S232.

The processing is returned to the step S28 in FIG. 4A. At this step, the internal combustion engine output torque $\widetilde{TQ}_{out}$ is converted into a driven wheel applied torque $\widetilde{TQ}_{out}^*$ applied to the driven wheel Wr. In this case, the torque is amplified by the torque converter interposed between the internal combustion engine E and the driven wheels Wr and therefore, a torque ratio $L_{MAT}$ from this amplification is calculated.

Figure 8:
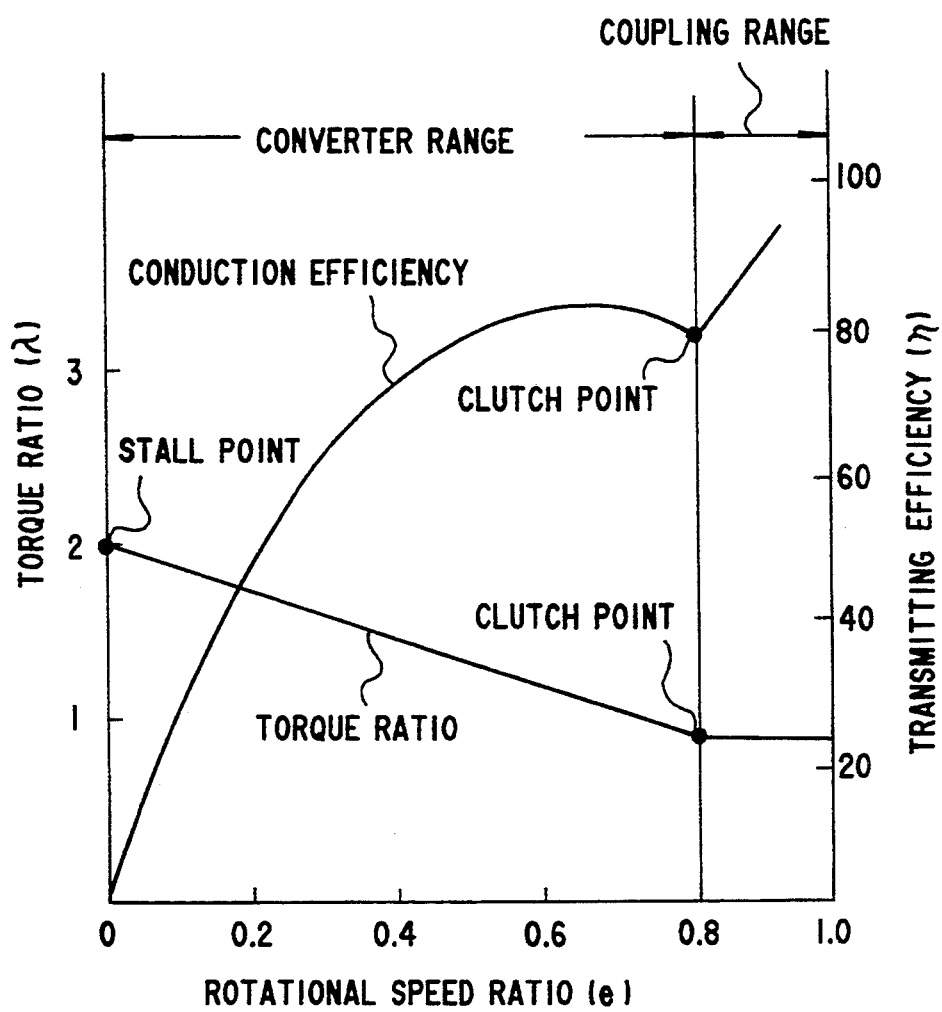
FIG. 8 is a graph illustrating an amplification characteristic of a torque of a torque converter.

Then, the calculation of the torque ratio in the torque converter will be described below in detail. The torque converter transmits a driving force from a pump shaft which is an input shaft to a turbine shaft which is an output shaft by virtue of an oil and also serves to amplify the transmission torque. In a converter region in which the rotational speed ratio e of the output shaft to the input shaft is equal to or less than about 0.8 or less, as shown in FIG. 8, the value of a torque ratio $\lambda$ transmitted is amplified within a range of $1<\lambda<2$, but in a coulping region in which the speed ratio e exceeds 0.8, the value of the torque ratio $\lambda$ is fixed to about 1, and the amplification is not conducted.

Figure 9:
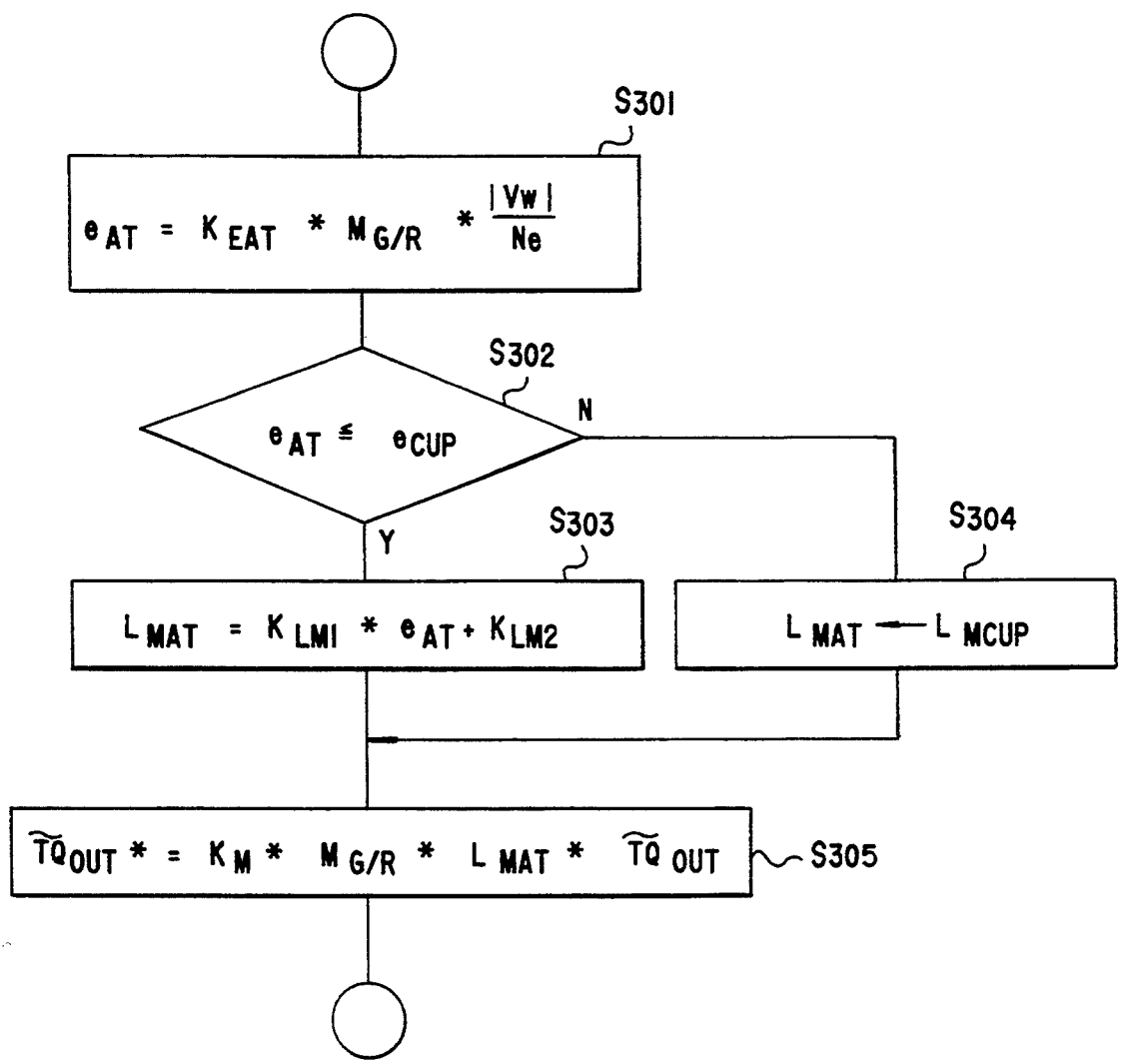
FIG. 9 is a flow chart illustrating a subroutine of a step S28.

FIG. 9 illustrates a procedure which is the subroutine of the step S28 and by which the torque ratio $L_{MAT}$ of the torque converter is calculated from the rotational speed of the internal combustion engine E and the driven wheel speed Vw. First, at a step S301, a rotational speed ratio $e_{AT}$ of the output shaft to the input shaft of the torque converter is calculated. More specifically, the rotational speed Np of the input shaft of the torque converter is equal to the rotational speed Ne of the internal combustion engine E, and the rotational speed Nt of the output shaft of the torque converter is represented by the following expression:

$$Nt = \frac{1,000 * |Vw|}{60 * 2\pi * Rw} * M_{G/R}$$

wherein Rw: an effective radius of a tire.

Therefore, the rotational speed ratio $e_{AT}$ is provided by the following equation:

$$e_{AT} = \frac{Nt}{Np} = K_{EAT} * M_{G/R} * \frac{|Vw|}{Ne}$$

wherein $K_{EAT}=1,000/60*2\pi*Rw$.

If the rotational speed ratio $e_{AT}$ of the torque converter is found in this manner, the rotational speed ratio $e_{AT}$ is compared with a coulping rotational speed ratio $e_{CUP}$ (about 0.8) of the torque converter at a step S302. If $e_{AT} \leq e_{CUP}$ (the converter region), the torque ratio $L_{MAT}$ is approximated by a straight line (see FIG. 8) decreased with an increase in rotational speed ratio $e_{AT}$ at a step S303, as represented by the following equation:

$$L_{MAT}=K_{LM1}*e_{AT}+K_{LM2}$$

wherein each of $K_{LM1}$ and $K_{LM2}$ is a constant.

On the other hand, if $e_{AT}>e_{CUP}$ at the step S302 (the coupling region), the torque ratio $L_{MAT}$ is approximated by a given value $L_{MCUP}$ (see FIG. 8) at a step S304.

If the torque ratio $L_{MAT}$ of the torque converter is calculated in the above manner, a driven wheel applied torque $\widetilde{TQ}_{OUT}^*$ is calculated, at a step S305, by multiplification of the internal combustion engine output torque $\widetilde{TQ}_{OUT}$ subjected to the above-described filtering by a transmission factor $K_M$ found in correspondence to an output signal from the gear position detector and the above-described pseudo reduction ratio $M_{G/R}$ and further by the torque ratio $L_{MAT}$ from the following equation:

$$\widetilde{TQ}_{OUT}^* = K_M * M_{G/R} * L_{MAT} * \widetilde{TQ}_{OUT}$$

Then, returning to the step S29 in FIG. 4A, a maximum value $\dot{V}_{EM}$ of the driven wheel slip variation rate $\dot{V}_E$ in the past 100 m sec. and a maximum value $\widetilde{TQ}_{OUTM}^*$ of the driven wheel applied torque $\widetilde{TQ}_{OUT}^*$ in the past 100 m sec. are searched. More specifically, the driven wheel aplication torque $\widetilde{TQ}_{OUT}^*$ and the driven wheel slip variation rate $\dot{V}_E$ which is a value resulting from differentiation of the driven wheel slip $V_E$ calculated on the basis of the driven wheel speed $V_w$ produced from the driven wheel speed detector 1 and the follower-wheel speed Vv produced from the follower wheel speed detector 2 are temporarily stored in the read only memory 15, and the maximum values $\dot{V}_{EM}$ and $\widetilde{TQ}_{OUTM}^*$ in the past 100 m sec. are selected from such stored driven wheel aplication torque values $\widetilde{TQ}_{OUT}^*$ and driven wheel slip variation rate values $\dot{V}_E$, respectively. Then, it is decided at a step S30 whether or not 100 m sec. has been lapsed. If NO, the above-described $\theta_{TO}^*$ is replaced by the initial throttle opening degree $\theta_{THINIT}$ at a step S31. Reversely, if YES at the step S30, a transmittable torque $TQ_{INIT}$ (i.e., a torque value resulting from subtraction of a surplus torque consumed for excessive slipping of the driven wheel Wr from the driven wheel applied torque $\widetilde{TQ}_{OUT}^*$) utilized for an increase in speed of the vehicle is map-searched at a step S32 from the maximum value $\dot{V}_{EM}$ of the driven wheel slip variation rate values and the maximum value $\widetilde{TQ}_{OUTM}^*$ of the driven wheel applied torque values which have been found at the step S29.

Then, at a step S33, the initial throttle opening degree $\theta_{THINIT}$ is calculated, but in this case, it is necessary to find an estimation torque ratio $L_{MINIT}$ by estimating a torque ratio of the torque converter at the time when the throttle valve 9 has been closed to the initial throttle opening degree $\theta_{THINIT}$, from the driven wheel target speed $V_{RP}$ and to correct the initial throttle opening degree $\theta_{THINIT}$ by this estimation torque ratio $L_{MINIT}$.

A procedure for calculating the estimation torque ratio $L_{MINIT}$ will now be described in detail. In general, an input torque Tp in the torque converter is represented by the following expression:

$$Tp=\tau*(Np/1,000)^2 \quad (1)$$

wherein $\tau$ is a pump absorbed torque.

If the expression (1) is rearranged by use of the rotational ratio $e(=Nt/Np)$ of the input shaft to the output shaft and the torque ratio $\lambda(=Tt/Tp)$ of the input shaft to the output shaft, it becomes the following equation:

$$Tp=Tt/\lambda=\tau*[Nt/(1,000*e)]^2 \quad (2)$$

On the other hand, the rotational speed Tt and the torque Nt of the output shaft are represented using the transmittable torque $TQ_{INIT}$ and target speed $V_{RP}$ of the driven wheel by the following equations:

$$Tt = TQ_{INIT}/G/R \quad (3)$$

$$Nt = \frac{1,000 * V_{RP}}{60 * 2\pi * Rw} * G/R \quad (4)$$

These equations (3) and (4) are substituted into the above-described equation (2) to effect a rearrangement for $\underline{e}$, thereby providing the following expression:

$$e^2 = \tau * \lambda * \frac{G/R^3}{(60 * 2\pi * Rw)^2} * \frac{V_{RP}^2}{TQ_{INIT}} \quad (5)$$

Figure 10:
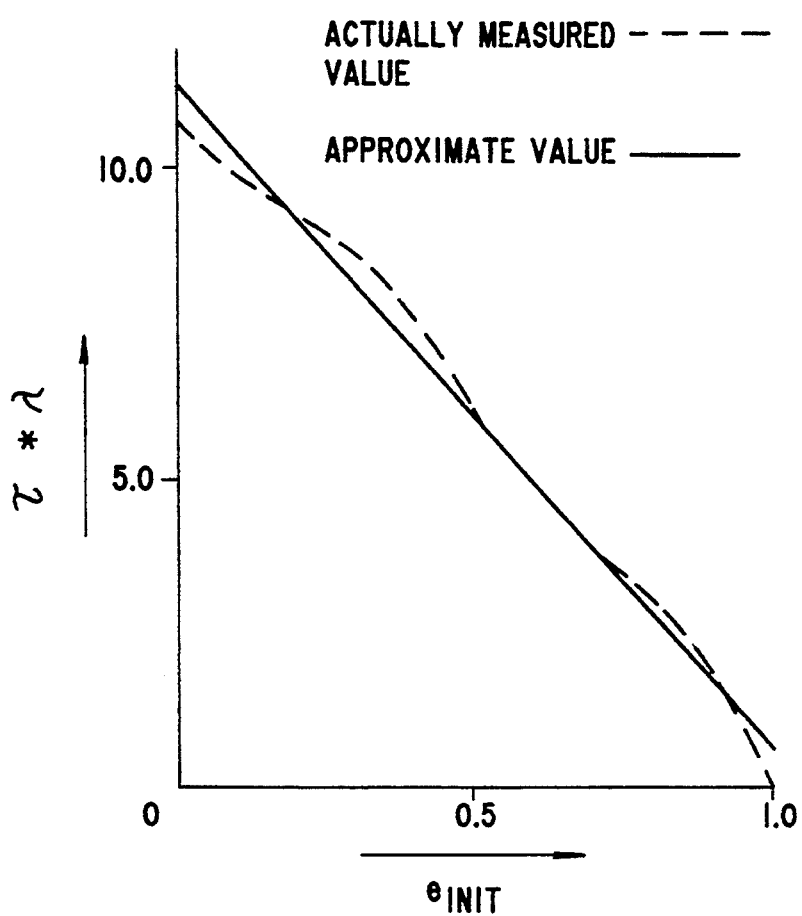
FIG. 10 is a graph illustrating a relationship between $e_{INIT}$ and $\tau^*\lambda$.

If the characteristics of $\tau*\lambda$ with respect to $\underline{e}$ is examined, it can be seen that any of them can be approximated by a linear or quadratic equation. FIG. 10 illustrates an example in which $\tau*\lambda$ can be approximated by a linear equation of i, i.e., by the following equation:

$$\tau*\lambda = -A*e + B \quad (6)$$

If the above equation (6) is substituted into the equation (5) to effect a rearrangement for i, the following quadratic equation is provided:

$$e^2 + 2*Ev*e - 2*(B/A)*Ev = 0 \quad (7)$$

wherein $$Ev = \frac{A}{2} * \frac{G/R^3}{(60 * 2\pi * Rw)^2} * \frac{V_{RP}^2}{TQ_{INIT}} = Ke * \frac{V_{RP}^2}{TQ_{INIT}} \quad (8)$$

If this quadratic equation is solved, because $\underline{e}$ is positive, the following equation is provided:

$$e = -Ev + \sqrt{Ev^2 + 2*(B/A)*Ev} \quad (9)$$

Figure 11:
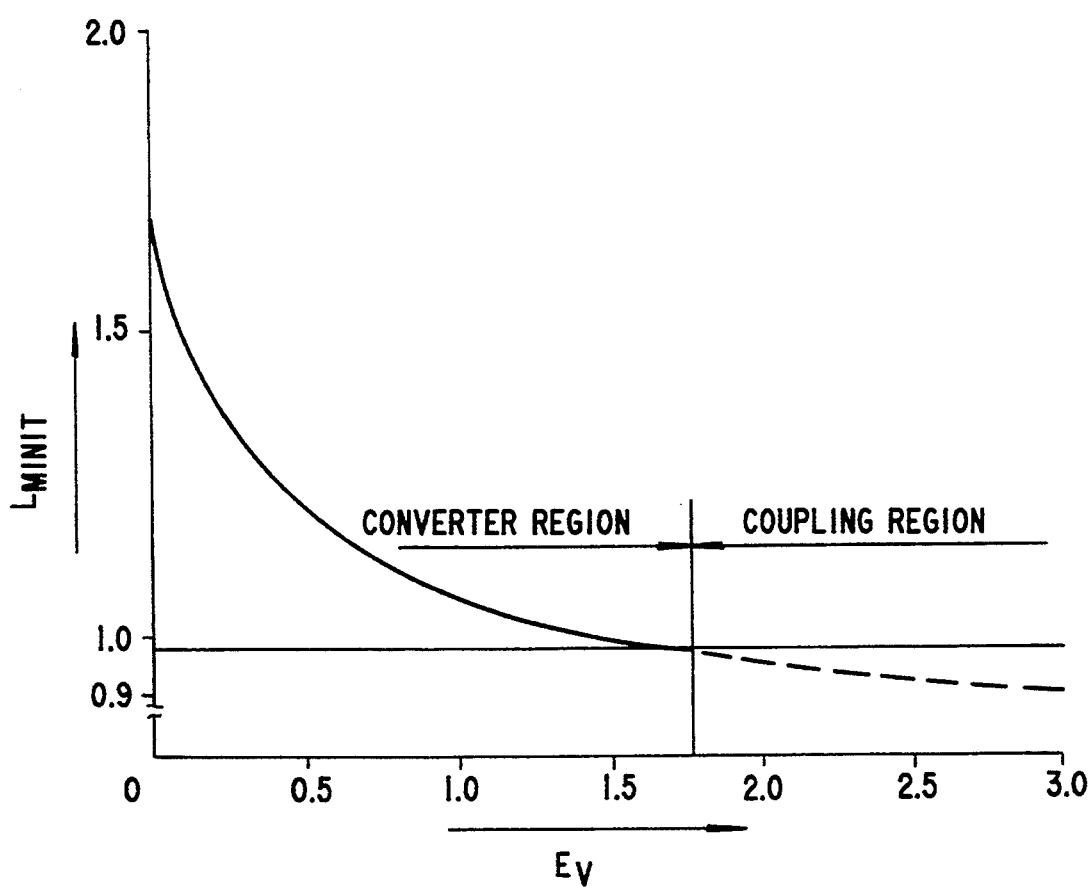
FIG. 11 is a graph illustrating a relationship between Ev and $L_{MINIT}$.

If a relationship between the rotational speed ration e (which will be referred to as an estimation rotational speed ratio $e_{INIT}$ of the torque converter hereinafter) and Ev which is a function of the driven wheel target speed $V_{RP}$ and the driven wheel transmittable torque $TQ_{INIT}$ is provided on the basis of the equation (9), a relationship between Ev and the estimation torque ratio $L_{MINIT}$ shown in FIG. 11 can be provided, because a relationship between the estimation rotational speed ratio $e_{INIT}$ and the torque ratio (which will be referred to as an estimation torque ratio $L_{MINIT}$ hereinafter) of the torque converter provided from such estimation rotational speed ratio $e_{INIT}$ is known as described above. Thus, the estimation torque ratio $L_{MINIT}$ can be searched from a value of Ev which is a function of the driven wheel target speed $V_{RP}$ and the driven wheel transmittable torque $TQ_{INIT}$.

Figure 12:
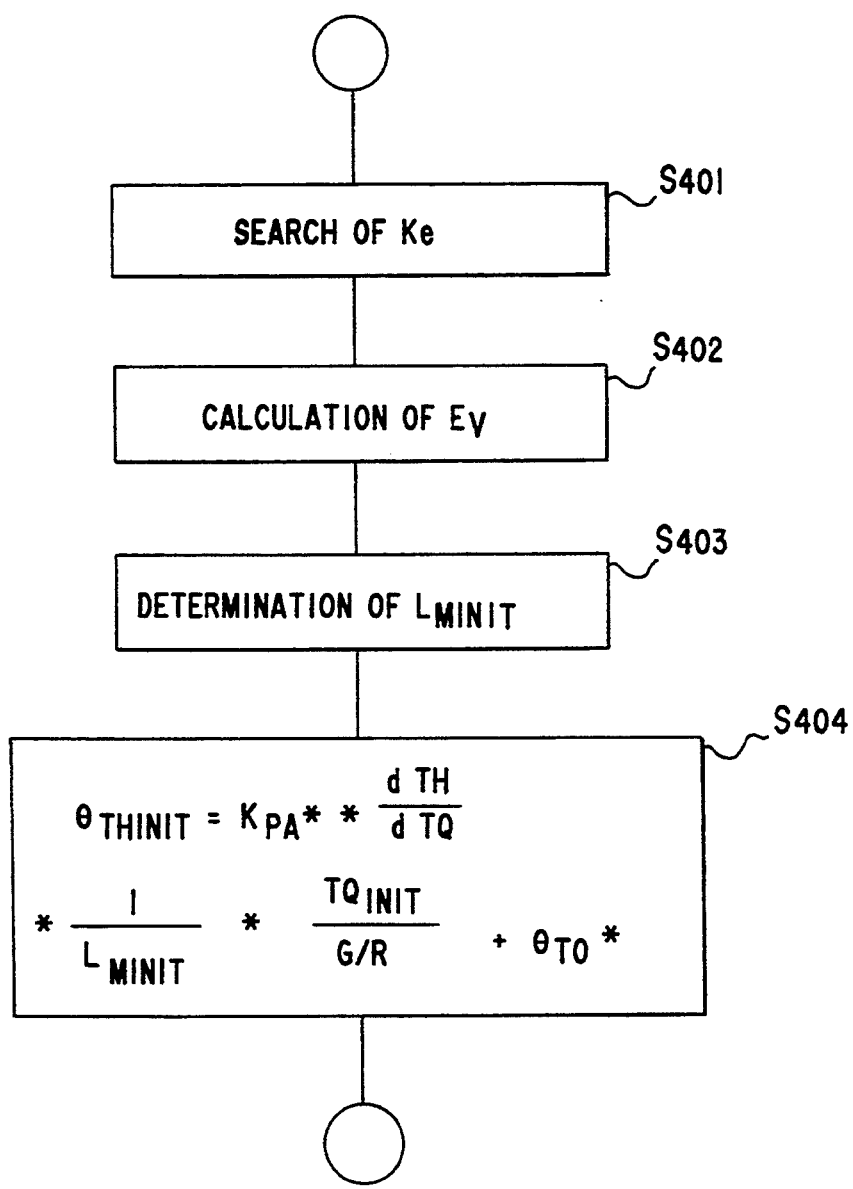
FIG. 12 is a flow chart illustrating a subroutine of a step S33.

This will be described below in connection with a flow chart shown in FIG. 12, which is a subroutine of the step S33 in FIG. 4B. First, if Ke (see the equation (8)) which is a function of the gear ratio G/R is searched on the basis of an output signal from the gear position detector 5 at a step S401, Ev (see the equation (8)) is calculated from the Ke, the driven wheel target speed $V_{RP}$ and the driven wheel transmittable torque $TQ_{INIT}$ at a step S402. If the Ev is found in this manner, an estimation torque ratio $L_{MINIT}$ is determined at a step S403 from the relationship shown in FIG. 11 and stored in the read only memory. Then, at a step S404, an initial throttle opening degree $\theta_{THINIT}$ is calculated according to the following equation:

$$\theta_{THINIT} = K_{PA} * \frac{dTH}{dTQ} * \frac{1}{L_{MINIT}} * \frac{TQ_{INIT}}{G/R} + \theta_{TO}*$$

wherein dTH/dTQ represents a variation in throttle opening degree which is required to provide a variation in unit torque at the crankshaft and stored as a function of the rotational speed Ne of the internal combustion engine, and $K_{PA}$ is a correcting factor which is determined on the basis of an output signal from the atmospheric pressure detector 12 in order to correct the dTH/dTQ provided at a standard atmospheric pressure.

If the initial throttle opening degree $\theta_{THINIT}$ is found in this manner, the minimum value thereof is limited to $\theta_{TO}*$ and the maximum value thereof is limited to $\theta_{WOT}*$ in the same manner as described above at steps S34 to S37 in FIG. 4B. Finally, the throttle initializing flag $F_{THINIT}$ is set at 1 at a step S38.

When the throttle feed-back control is newly started at a step S9, the above-described $\theta_{THINIT}$ is used as an initial throttle opening degree. Such initial throttle opening degree $\theta_{THINIT}$ corresponds to a throttle opening degree which provides the drive-wheel transmittable torque $TQ_{INIT}$ utilized for an increase in speed of the vehicle, i.e., a torque resulting from subtraction of a surplus torque consumed for an excessive slipping of the driven wheel Wr from the driven wheel applied torque $TQ_{OUT}*$ and therefore, it is possible to promptly converge the final throttle opening degree to a value which provides an optimal slip rate of the driven wheel.

What is claimed is:

1. A driven wheel torque control system including a torque converter provided between an internal combustion engine of a vehicle and a driven wheel when slipping of the driven wheel becomes excessive, said system comprising:

an internal combustion engine output torque calculating means for calculating an output torque from said internal combustion engine;

a driven wheel applied torque calculating means for converting the internal combustion engine output torque calculated by said internal combustion engine output torque calculating means into a driven wheel applied torque by use of a torque ratio of said torque converter;

a surplus torque calculating means for calculating a surplus torque consumed for slipping of said driven wheel;

a transmittable-torque calculating means for calculating torque transmittable between the driven wheel and a road surface on the basis of output signals from said driven wheel applied torque calculating means and said surplus torque calculating means;

a control quantity determining means for calculating a control quantity by use of said transmittable torque; and a driven wheel torque reducing means, responsive to said control quantity, for reducing an output torque of the driven wheel.

2. A driven wheel torque control system according to claim 1, further including a variable reduction gear provided between said internal combustion engine and said driven wheel, wherein said surplus torque is calculated on the basis of a slip variation rate of the driven wheel and a reduction of said variable reduction gear.

3. A driven wheel torque control system according to claim 1, wherein said driven wheel torque reducing means comprises:

an internal combustion engine output torque controller including, (a) a driven wheel target speed calculating means for calculating a target speed of the driven wheel, (b) an estimated torque ratio calculating means for calculating an estimated torque ratio at a time when said driven wheel torque reducing means is controlled, by use of said driven wheel target speed as an output rotational speed of said torque converter, and (c) a means for correcting the control quantity for said internal combustion engine output torque control means by said estimated torque ratio.

4. A driven wheel torque control system including a torque converter provided between an internal combustion engine of a vehicle and a driven wheel when slipping of the driven wheel becomes excessive, said system comprising:

a driven wheel torque reducing means, responsive to a control quantity, for reducing an output torque of the driven wheel;

an internal combustion engine output torque calculating means for calculating an output torque from said internal combustion engine;

a driven wheel target speed calculating means for calculating a target speed of said driven wheel;

an estimated torque ratio calculating means for calculating an estimated torque ratio at a time when said driven wheel torque reducing means is controlled, by use of said target speed of the driven wheel as an output rotational speed of said torque converter;

a driven wheel applied torque calculating means for converting the internal combustion engine output torque calculated by said internal combustion engine output torque calculating means into a driven wheel applied torque by use of said estimated torque ratio; and a control quantity determining means for calculating said control quantity for said driven wheel torque reducing means on the basis of said driven wheel applied torque.

5. The driven wheel torque control system according to claim 1, wherein said driven wheel torque reducing means includes a pulse motor controlling the opening and closing of a throttle of the internal combustion engine in response to said control quantity.

* * * * *